(12) United States Patent
Saitoh

(10) Patent No.: US 7,306,279 B2
(45) Date of Patent: Dec. 11, 2007

(54) VEHICLE REAR DOOR AND METHOD OF ASSEMBLING SAME

(75) Inventor: Hajime Saitoh, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/612,138

(22) Filed: Dec. 18, 2006

(65) Prior Publication Data
US 2007/0145773 A1 Jun. 28, 2007

(30) Foreign Application Priority Data
Dec. 28, 2005 (JP) ............... 2005-378020

(51) Int. Cl.
B60J 5/10 (2006.01)
(52) U.S. Cl. .................. 296/146.8; 296/205
(58) Field of Classification Search .......... 296/29, 296/30, 56, 146.8, 193.08, 203.04, 205, 146.5, 296/146.6, 193.06, 203.03, 210
See application file for complete search history.

(56) References Cited

U.S. PATENT DOCUMENTS

| 4,341,414 | A | * | 7/1982 | Chiba ........................... 296/56 |
| 4,566,728 | A | * | 1/1986 | Theodore ....................... 296/76 |
| 4,773,700 | A | * | 9/1988 | Sannomiya ............... 296/146.8 |
| 4,799,730 | A | * | 1/1989 | Harasaki ................ 296/203.04 |
| 4,880,267 | A | * | 11/1989 | Ohya ........................... 296/56 |
| 4,886,312 | A | * | 12/1989 | Asoh ........................... 296/76 |
| 5,213,391 | A | * | 5/1993 | Takagi ......................... 296/205 |
| 5,226,696 | A | * | 7/1993 | Klages et al. .......... 296/203.01 |
| 5,269,585 | A | * | 12/1993 | Klages et al. ................ 296/205 |
| 5,449,213 | A | * | 9/1995 | Kiley et al. .................... 296/56 |
| 5,876,086 | A | * | 3/1999 | Lagrou et al. .......... 296/146.11 |
| 6,003,931 | A | * | 12/1999 | Dancasius et al. ........ 296/146.8 |
| 6,015,182 | A | * | 1/2000 | Weissert et al. .......... 296/146.6 |
| 6,019,418 | A | * | 2/2000 | Emerling et al. .......... 296/146.8 |
| 6,053,562 | A | * | 4/2000 | Bednarski ................. 296/146.5 |
| 6,241,307 | B1 | * | 6/2001 | Kim .......................... 296/146.8 |
| 6,318,782 | B1 | * | 11/2001 | Suzuki et al. .............. 296/37.1 |
| 6,471,284 | B2 | * | 10/2002 | Landmesser .............. 296/146.8 |
| 6,659,538 | B2 | * | 12/2003 | Scheid ...................... 296/146.8 |
| 6,733,063 | B2 | * | 5/2004 | Paiva et al. ..................... 296/56 |
| 6,776,449 | B2 | * | 8/2004 | Komatsu et al. .......... 296/146.5 |
| 6,926,350 | B2 | * | 8/2005 | Gabbianelli et al. ... 296/203.01 |
| 2003/0122399 | A1 | * | 7/2003 | Seksaria et al. .......... 296/146.8 |
| 2007/0145767 | A1 | * | 6/2007 | Saitoh et al. ............. 296/146.5 |

(Continued)

FOREIGN PATENT DOCUMENTS

DE 196 35 873 3/1998

(Continued)

Primary Examiner—D. Glenn Dayoan
Assistant Examiner—Paul Chenevert
(74) Attorney, Agent, or Firm—Rankin, Hill, Porter & Clark LLP

(57) ABSTRACT

A rear door that is provided in an openable and closable manner at a vehicle body rear portion, the rear door having: a frame portion that forms along an external edge of the rear door, a door windshield panel that is provided in the frame portion, and a lateral beam that spans between both lower end corner portions of the windshield panel, wherein at coupling portions of the frame portion and the lateral beam, the frame portion and the lateral beam each have a closed sectional structure, and the closed sections of the frame portion and the lateral beam are continuous.

6 Claims, 8 Drawing Sheets

U.S. PATENT DOCUMENTS

2007/0145768 A1 * 6/2007 Saitoh et al. ............ 296/146.5
2007/0170751 A1 * 7/2007 Tanaka et al. ........... 296/146.6

FOREIGN PATENT DOCUMENTS

| | | | | |
|---|---|---|---|---|
| EP | 111457 A2 * | 6/1984 | ................ | 296/56 |
| FR | 2695877 A1 * | 3/1994 | ............ | 296/146.11 |
| JP | 61016175 A * | 1/1986 | ............ | 296/203.01 |
| JP | 05319304 A * | 12/1993 | ................ | 296/29 |
| JP | 09-142150 | 6/1997 | | |
| JP | 2000-247148 | 9/2000 | | |

* cited by examiner

VEHICLE REAR DOOR AND METHOD OF ASSEMBLING SAME

BACKGROUND OF THE INVENTION

1. Field of the Invention

The present invention relates to a rear door of a vehicle such as an automobile and a method of assembling the rear door.

Priority is claimed on Japanese Patent Application No. 2005-378020, filed Dec. 28, 2005, the content of which is incorporated herein by reference.

2. Description of Related Art

There are vehicles such as automobiles that are provided with a rear door to be opened and closed at the vehicle body rear opening portion. In order to facilitate the taking out and putting in of luggage, the vehicle body rear opening portion may be enlarged, with a comparatively large rear door suitably attached to this vehicle body rear opening portion. However, at the same time the strength and rigidity of the rear door must be ensured. For this reason, a portion of the interior of the rear door has conventionally been formed in a closed sectional structure to ensure the strength and rigidity of the rear door (refer, for example, to Japanese Unexamined Patent Application, First Publication No. H09-142150).

However, in the conventional rear door structure, since only a portion of the lower edge of the door windshield panel can be formed with a closed sectional structure, it has not been possible to sufficiently ensure the rigidity of the lower edge corner portions of the door windshield panel, where strength is most required. Accordingly, a rear door with greater rigidity has been desired.

SUMMARY OF THE INVENTION

Therefore, the present invention has as its object to provide a rear door that can increase rigidity at the lower end corner portions of the door windshield panel and ensure overall rigidity of the rear door by suppressing local deformation and provide a method of assembling the rear door.

The rear door of the present invention is a rear door that is provided in an openable and closable manner at a vehicle body rear portion, the rear door includes a frame portion that forms along an external edge of the rear door, a door windshield panel that is provided in the frame portion, and a lateral beam that spans between both lower end corner portions of the door windshield panel, wherein at coupling portions of the frame portion and the lateral beam, the frame portion and the lateral beam each have a closed sectional structure, with closed sections of the frame portion and the lateral beam being continuous.

Such a constitution can prevent local changes in the cross-sectional shape at the lower end corner portions of the door windshield panel by the closed sections being continuous at the coupling portions of the frame portion and the lateral beam. Therefore, it is possible to prevent local reductions in rigidity and increase the rigidity of the rear door. Accordingly, in the case of adopting a rear door structure that mounts the door windshield panel in a portion of the door opening, it is possible to increase the support rigidity of the lateral beam provided for supporting the lower end corner portions of the door windshield panel and the frame portion, and thereby increase the overall rigidity of the rear door.

Also, the frame portion may include a frame member that is provided on the vehicle interior side and a panel member that is provided on the vehicle exterior side, and be provided with coupling members that connect the closed sections of the frame portion and the lateral beam at the coupling portions by coupling the frame member and the lateral beam.

Such a constitution can increase the rigidity of both lower end corner portions of the door windshield panel, which are the base portions of the lateral beam, and so can increase the support rigidity of the door windshield panel. For that reason, it is possible to increase the rigidity of the rear door.

Also, it is possible to employ a structure in which fasteners such as bolts and the like are not required and the closed sections are connected by welding. Cost, weight, and the number of assembly work steps can therefore be reduced.

Moreover, the coupling members may each include an extending portion that is formed along the lateral beam.

Such a constitution enables reliable apportionment on the lateral beam of the load that acts on both lower end corner portions of the door windshield panel.

Moreover, the coupling members at the coupling portions may be made to have a plate thickness that is greater than that of the other members.

Such a constitution makes possible restricting the increase in plate thickness to only the coupling members, increasing rigidity, and minimizing an increase in weight. It is therefore possible to lighten the rear door.

Moreover, the coupling members may be provided with co-weld portions to be weld-joined to the frame portion and the lateral beam.

Such a constitution can increase the coupling strength between the frame portion and the lateral beam. Therefore, it is possible to increase the support rigidity of the door windshield panel.

Also, the method of assembling a rear door according to the present invention is a method of assembling the rear door that is provided in an openable and closable manner at a vehicle body rear portion, the rear door having a frame portion that is formed along an external edge of this rear door, a door windshield panel that is provided in the frame portion, and a lateral beam that spans between both lower end corner portions of the door windshield panel; the frame portion having a frame member that is provided on the vehicle interior side and a panel member that is provided on the vehicle exterior side; and coupling members being provided that connect closed sections of the frame portion and the lateral beam at coupling portions by coupling the frame member and the lateral beam; the method includes: connecting the lateral beam and the panel member to make a panel body; connecting the coupling members and the frame member to make a frame body; and connecting the panel body and the frame body so that the closed sections are continuous at the coupling portions of the frame portion and the lateral beam.

Such a constitution makes possible ensuring the positional accuracy of the lateral beam that constitutes the panel body with respect to the frame member. Therefore, the mounting accuracy of the lateral beam with respect to the entire rear door can be easily ensured, and accordingly the fixing accuracy of the door windshield panel can be ensured.

DETAILED DESCRIPTION OF THE INVENTION

The embodiment of the present invention shall next be described with reference to the attached drawings.

Figure 1:
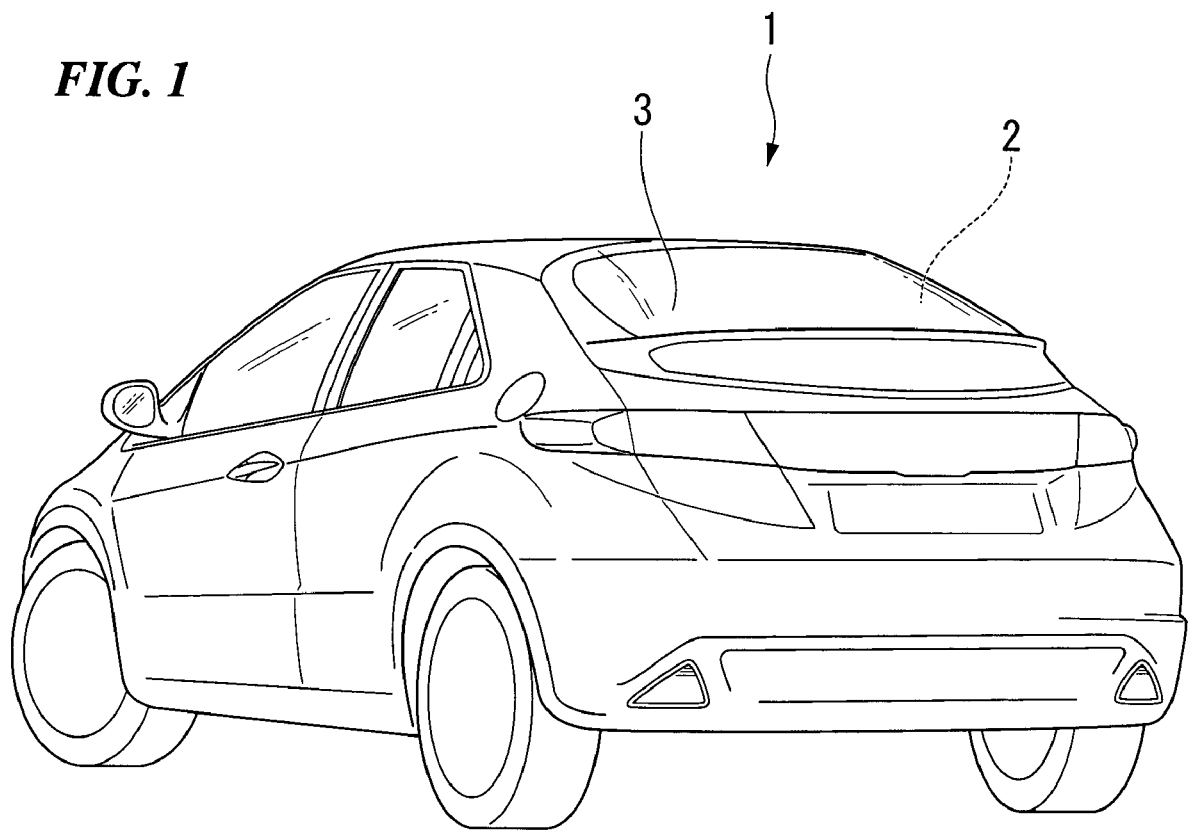
FIG. 1 is a rear perspective view of a vehicle of the embodiment of the present invention.

As shown in FIG. 1, at a door mounting opening portion 2 at the vehicle body rear portion of a vehicle 1, a tailgate (rear door) 3 is supported to be openable and closable in a vertical direction via hinge brackets (not shown).

Figure 2:
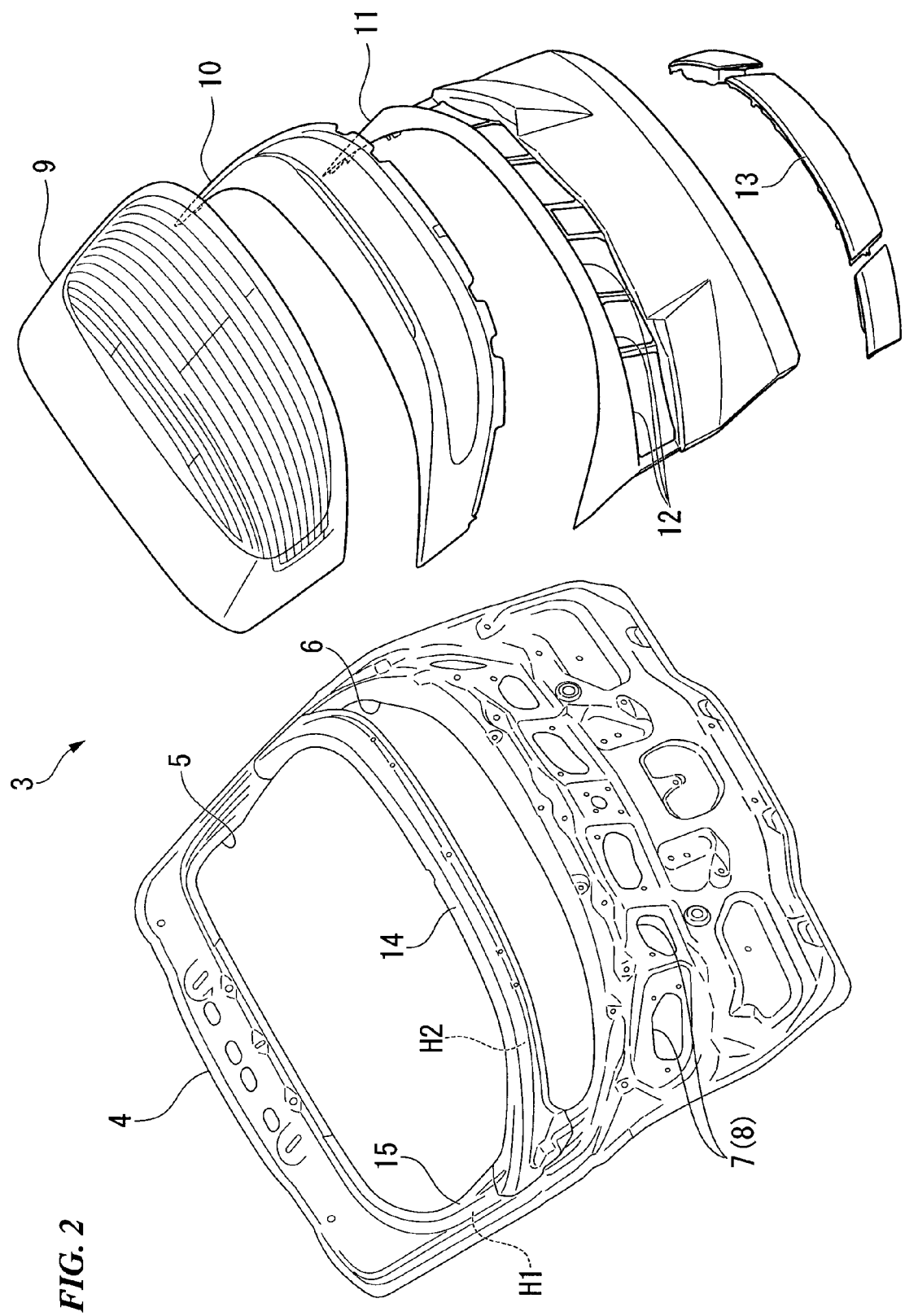
FIG. 2 is an exploded perspective view of the tailgate of the embodiment of the present invention.

As shown in FIG. 2, the tailgate 3 is provided with a frame unit 4 made of steel plate. In frame unit 4 are formed, from the upper side, a glass mounting opening portion 5, an outer plate member mounting opening portion 6, and a rear light mounting portion 8 having a plurality of holes 7. An interior finishing material (not shown) is attached to the interior surface of the frame unit 4, and a plurality of resin outer plate components are mounted to the exterior surface of the frame unit 4.

Specifically, a door glass (door windshield panel) 9 is mounted in the glass mounting opening portion 5, and an extra window panel 10 is mounted in the outer plate member mounting opening portion 6. Also, a lower garnish 11 is mounted on the lower side of the extra window panel 10. A rear light 13 is mounted across the vehicle width direction to an opening portion 12 of the lower garnish 11 corresponding to the rear light mounting portion 8.

Here, the glass mounting opening portion 5 and the outer plate member mounting opening portion 6 of the frame unit 4 are partitioned by a lateral beam 14. Also, a frame portion 15 and the lateral beam 14 of the frame unit 4 are formed with closed sectional structures so that closed sections H1 and H2 are smoothly continuous at the coupling portions of the frame portion 15 and the lateral beam 14.

Figure 3:
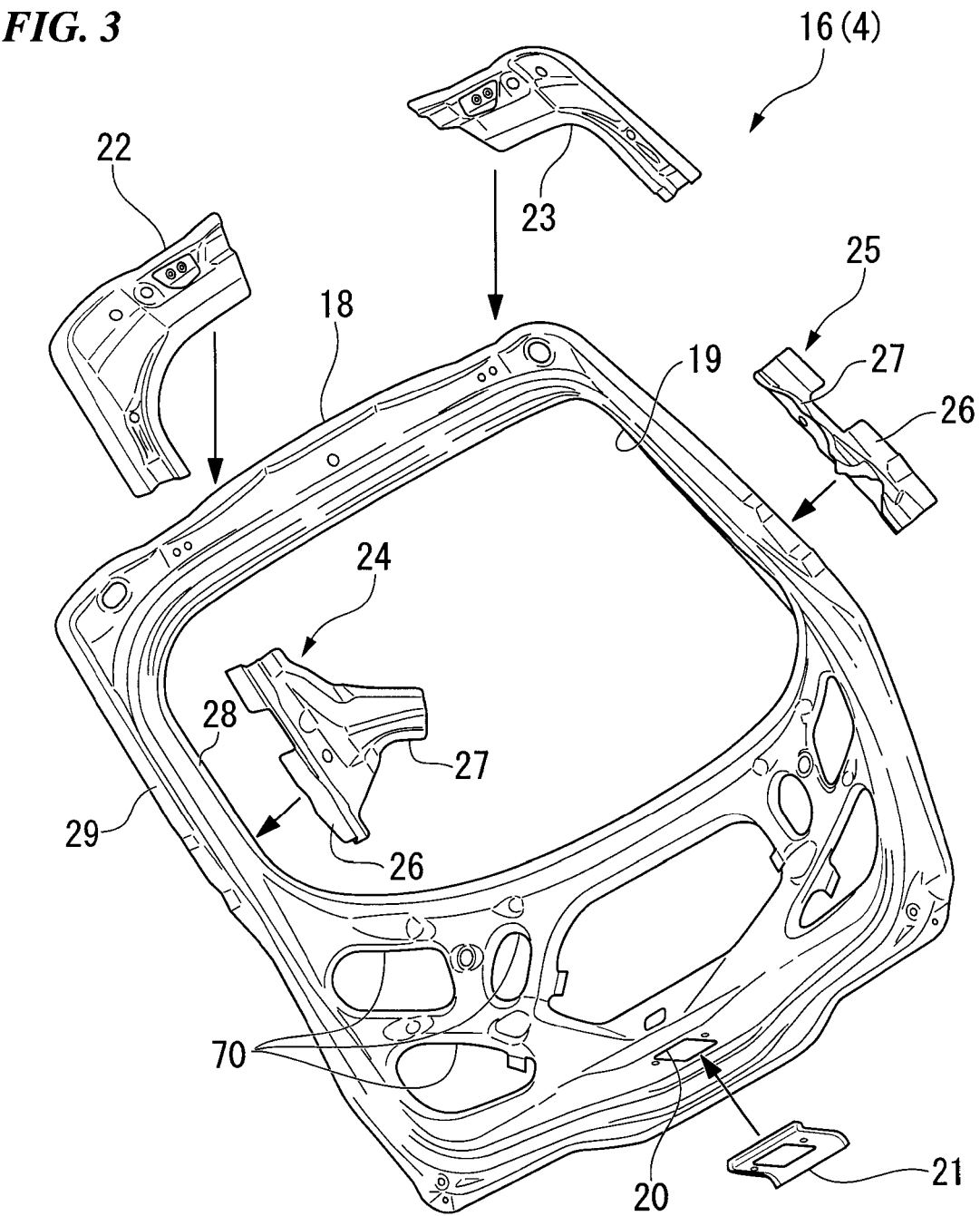
FIG. 3 is an exploded perspective view of the frame component of the embodiment of the present invention.
Figure 4:
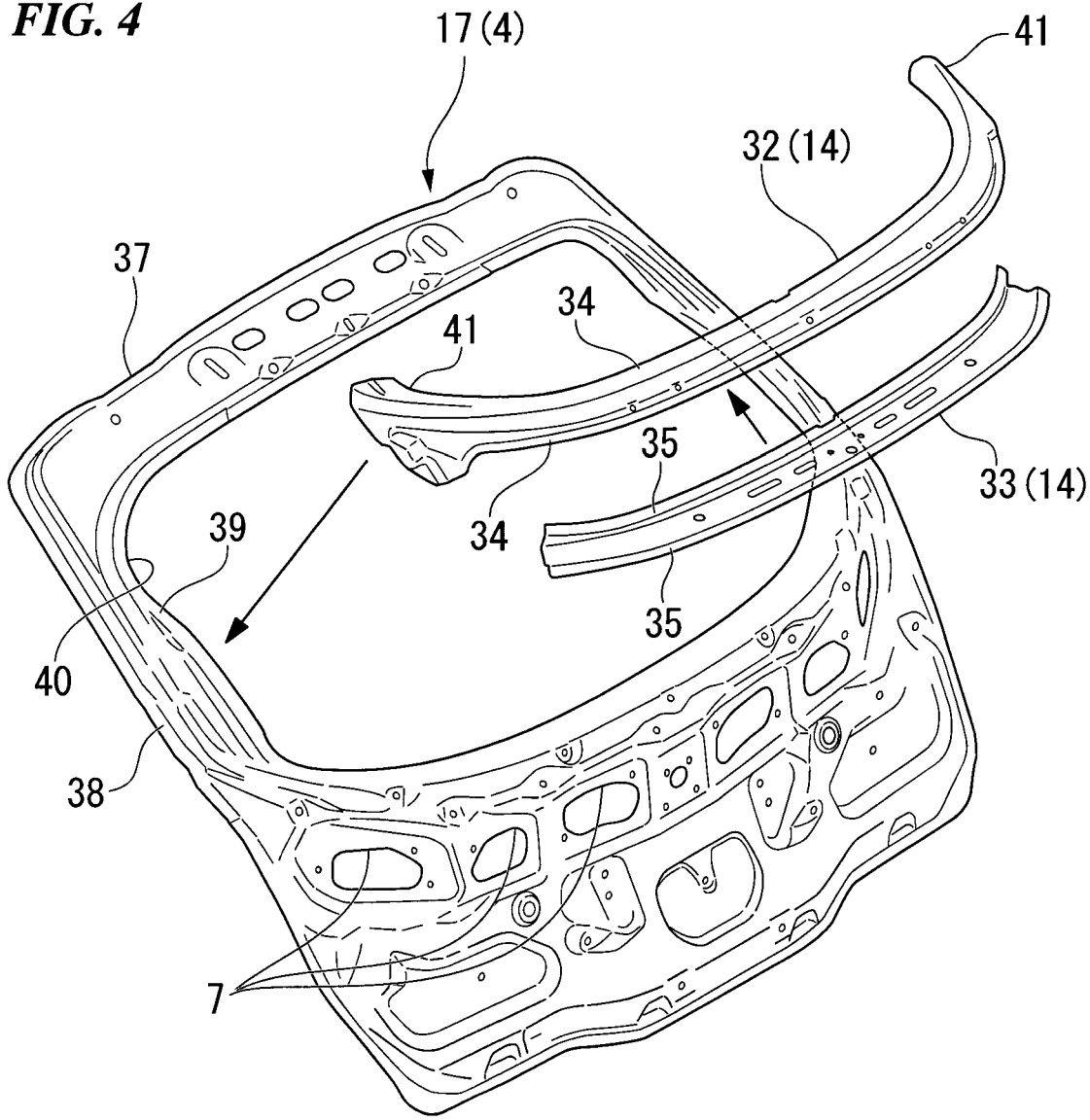
FIG. 4 is an exploded perspective view of the skin component of the embodiment of the present invention.

As shown in FIG. 3 and FIG. 4, the frame unit 4 is constituted by a frame component (frame body) 16 that has a frame (frame member) 18 as a main body and by a skin component (panel body) 17 that has a skin (panel member) 37 as a main body, being joined together by a hemming process at the peripheral edge of the frame component 16 and the peripheral edge of the skin component 17. In this way the vertical positional accuracy can be assured by employing subassemblies above and below.

As shown in FIG. 3, the frame component 16 is provided with the frame-shaped frame 18.

A frame opening portion 19 is formed in the upper half portion of the frame 18 for mounting the door glass 9 and the extra window panel 10. A plurality of holes 70 are formed on the lower side of the frame opening portion 19 to lighten the tailgate 3. A lock opening portion 20 is formed in the middle portion in the vehicle width direction of the lower end of the frame 18, and a lock stiffener 21 for reinforcement is mounted on the peripheral edge of this lock opening portion 20.

L-shaped upwardly convex hinge stiffeners 22 and 23 for reinforcing the hinge bracket mounting portions (not shown) of the tailgate 3 are joined to the left and right upper corner portions of the frame 18, respectively. The peripheral edge of the frame opening portion 19 is formed with a hat-shaped cross section that opens upward. Also, corner stiffeners (coupling members) 24 and 25 are mounted near the lower side of the left and right side edge portions, respectively, of the frame opening portion 19. These corner stiffeners 24 and 25 are each provided with a joining portion 26 that is joined along the side edge portion of the frame opening portion 19 and an extending portion 27 that is formed to extend obliquely downward from the joining portion 26 to follow the lateral beam 14. The plate thickness of the corner stiffeners 24 and 25 is between 1.5 and 2.0 times that of the other members, with a thicker material than the other members being adopted. The other members referred to here are the frame 18, the skin 37, an arch upper 32, and an arch lower 33.

Figure 5:
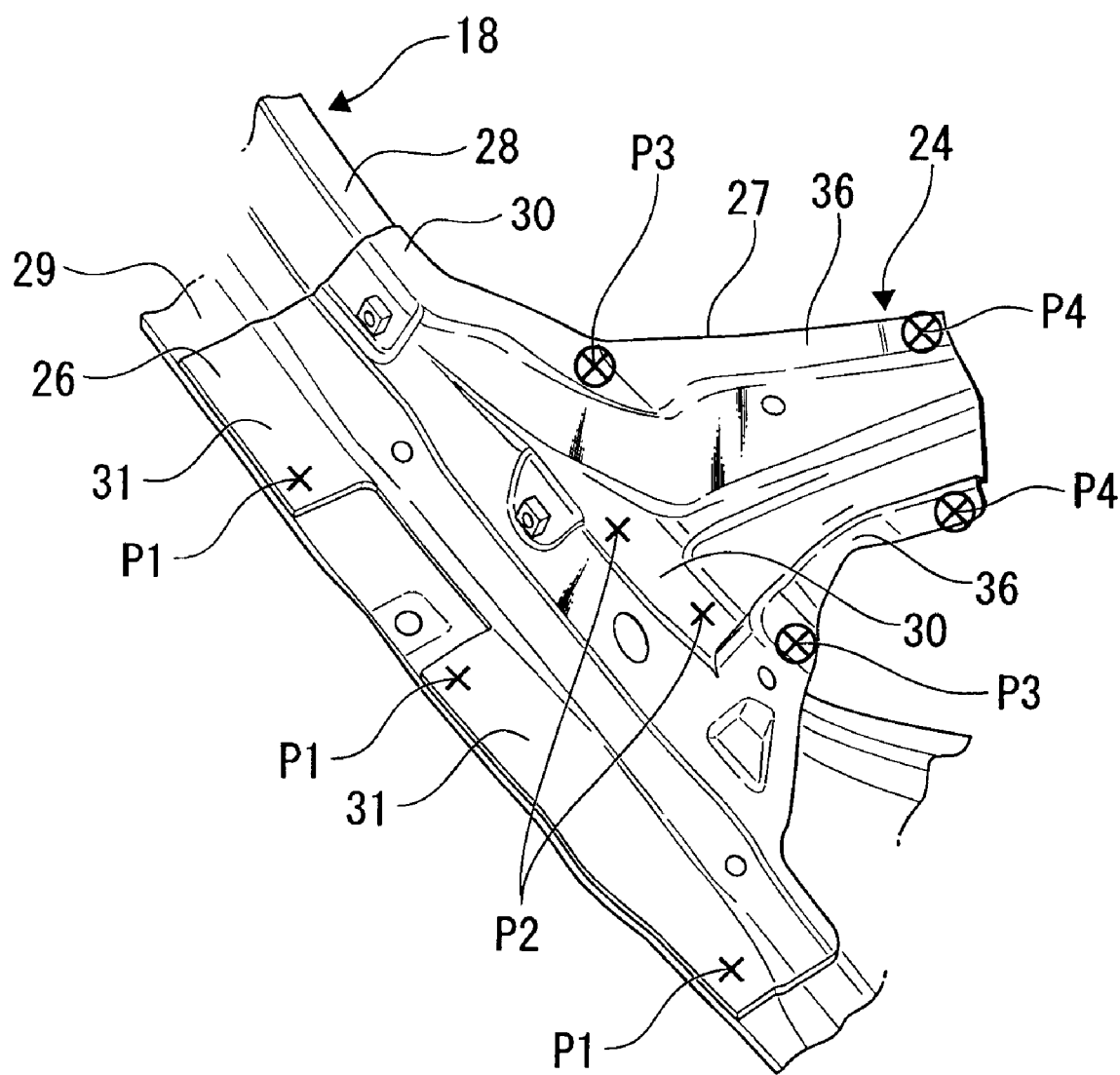
FIG. 5 is a main portion perspective view of a frame component of the embodiment of the present invention.

FIG. 5 is a perspective view showing the state of the corner stiffener 24 joined to the frame 18 by spot welding. Note that the corner stiffener 25 has the same constitution as the corner stiffener 24 except for the left-right reversal. Therefore, the explanation thereof shall be omitted here.

Figure 8:
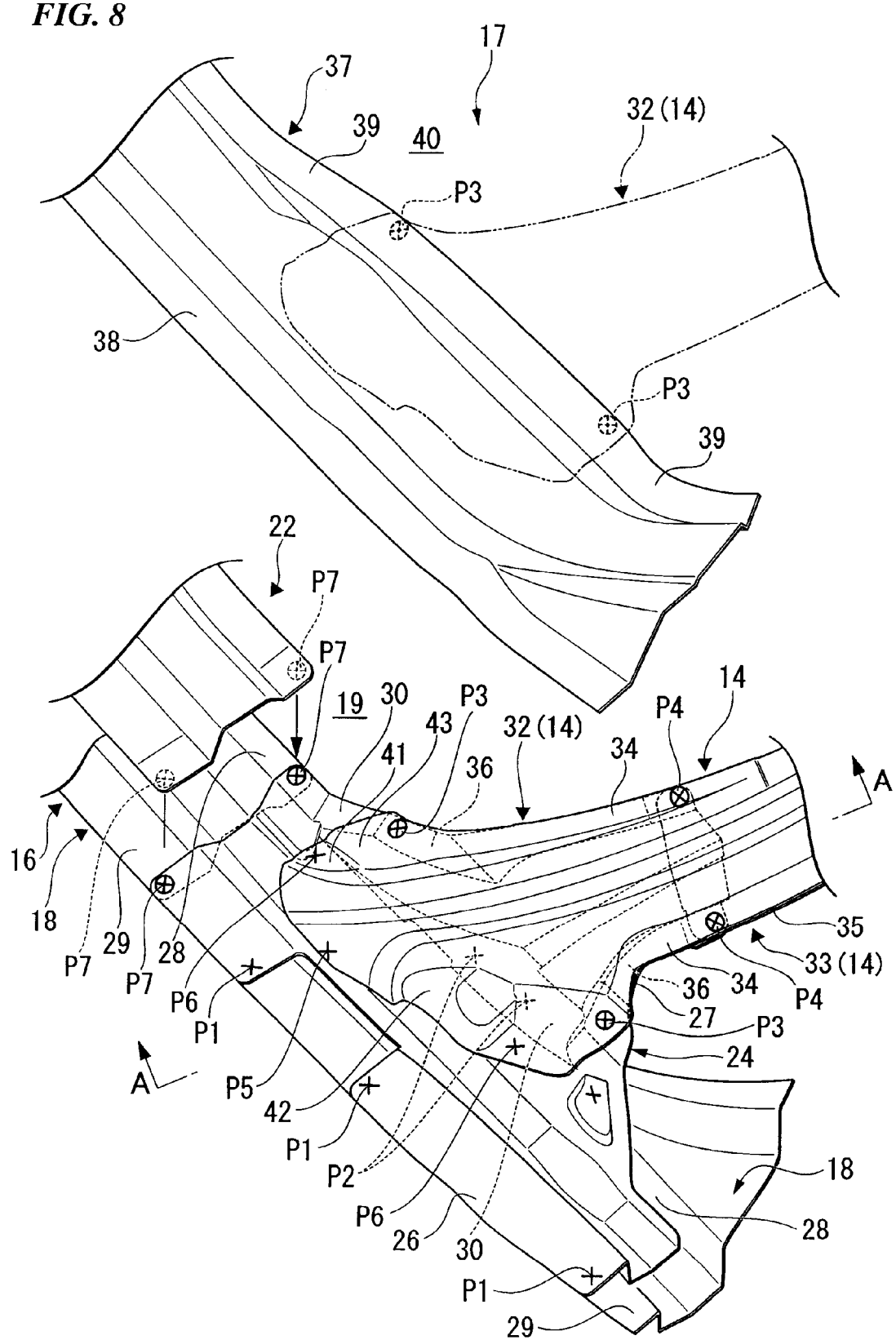
FIG. 8 is a main portion perspective view of the coupling portion of the frame portion and the lateral beam of the embodiment of the present invention.

In FIG. 5 and FIG. 8, the joining portion 26 of the corner stiffener 24 has a width dimension that straddles an inside flange portion 28 and an outside flange portion 29 of the frame 18. This joining portion 26 is provided with an inside flange 30 and an outside flange 31 that correspond respectively to the inside flange portion 28 and the outside flange portion 29. Also, the extending portion 27 of the corner stiffener 24 extends to meet the lateral beam 14 by gradually narrowing in width from the inside flange 30. The extending portion 27 has at both side portions thereof a flange 36 and 36 that is joined to flanges 34 and 35 of the arch upper 32 and the arch lower 33, respectively. The extending portion 27 is formed with a hat-shaped cross section that opens upward.

The outside flange 31 of the joining portion 26 of the corner stiffener 24 is joined by spot welding at spot points P1 to outside flange portions 29 and 38 of the frame 18 and the skin 37, respectively. Also, the central portion of the inside flange 30 in the vertical direction is joined by spot welding at spot points P2 to the inside flange portion 28 of the frame 18. Spot points (co-weld portions) P3 are provided at the base portion side of the flanges 36 and 36 of the extending portion 27 of the corner stiffener 24 have where an inside flange portion 39 of the skin 37 and the base portion of the flange 34 of the arch upper 32 are spot welded. Spot points (co-weld portions) P4 are set at the end of the flange 36 and 36 of the extending portion 27 of the corner stiffener 24 where the flange 34 of the arch upper 32 and the end of the arch lower 33 are welded.

As shown in FIG. 4, the skin component 17 is provided with a frame-shaped skin 37 similarly to the frame component 16. A skin opening portion 40 is formed in the upper half portion of the skin 37 for mounting the door glass 9 and the extra window panel 10. The peripheral edge of the skin opening portion 40 is provided with the inside flange portion 39, which is formed with a hat-shaped cross section that opens downward, and the outside flange portion 38. The plurality of holes 7 that correspond to the rear light 13 are formed on the lower side of the skin opening portion 40. The arch upper 32 that constitutes the lateral beam 14 is joined in the vehicle width direction near the lower side of the side edge portions of the skin opening portion 40, and together with the arch lower 33 that is joined to the underside of the arch upper 32, constitutes the lateral beam 14 having a closed sectional structure.

Specifically, the arch upper 32 is formed with a hat-shaped cross section that opens downward, with the flange 34 and 34 formed on both side edges thereof. By contrast, the arch lower 33 is formed with a hat-shaped cross section that opens upward, with the flange 35 and 35 formed on both side edges thereof. By joining the flange 34 and 34 of the arch upper 32 and the flange 35 and 35 of the arch lower 33 by spot welding, the lateral beam 14 with a closed sectional structure is formed.

Figure 6:
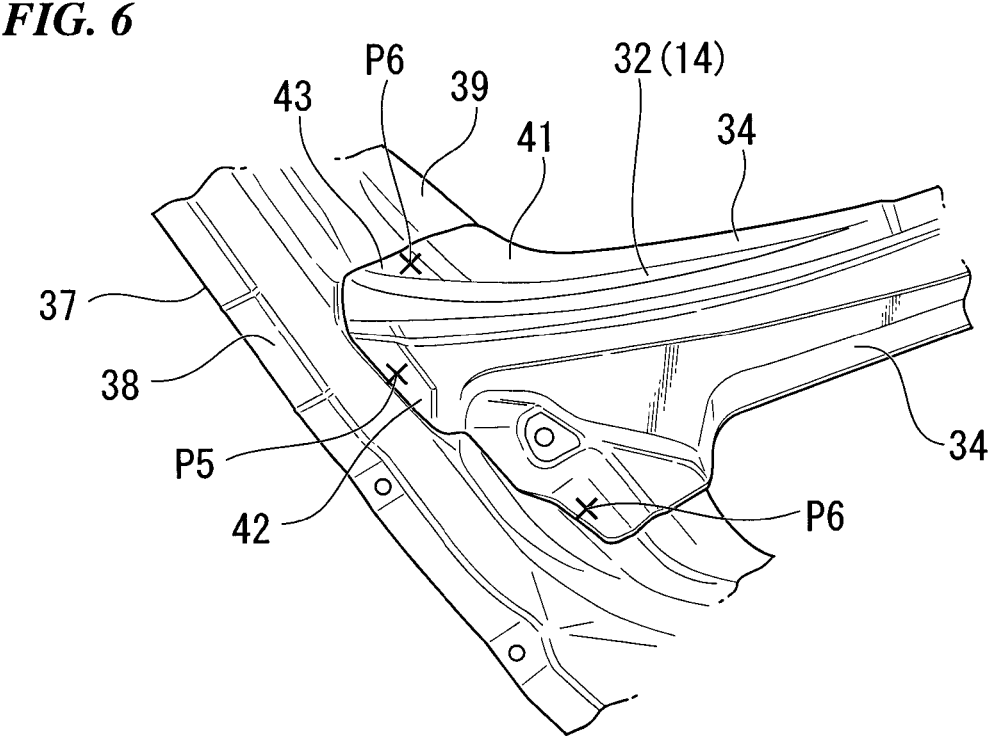
FIG. 6 is a main portion perspective view of a skin component of the embodiment of the present invention.
Figure 7:
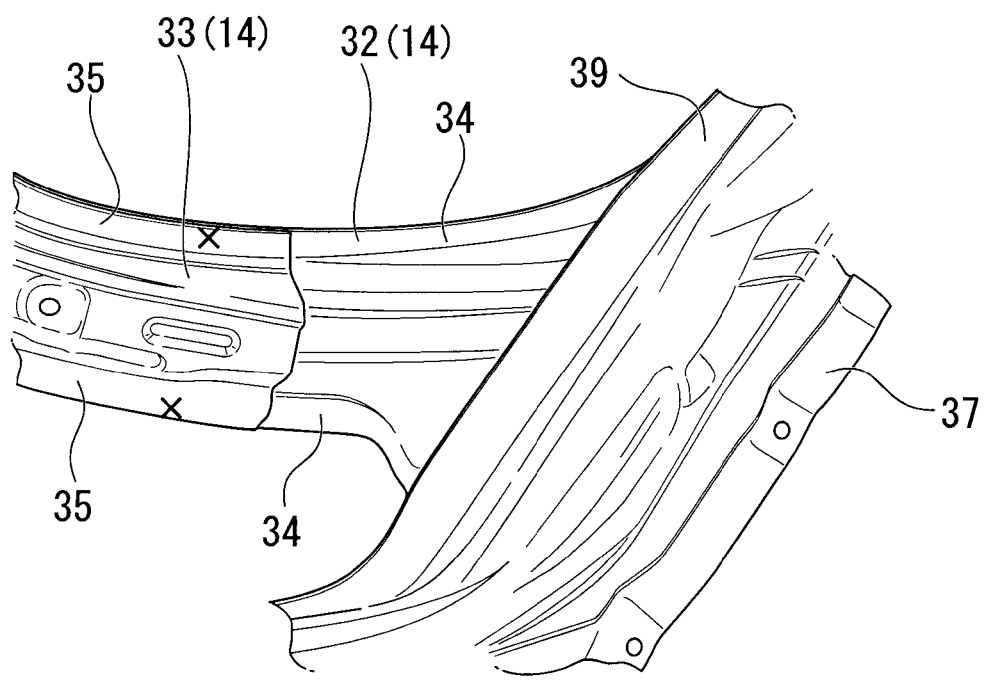
FIG. 7 is a perspective view from the back side of FIG. 6.

FIG. 6 is a perspective view from above of the joining portion of the skin 37 and the arch upper 32 on the vehicle body left side, and FIG. 7 is a perspective view of the joining portion of the arch upper 32 and the arch lower 33 on the vehicle body left side.

In FIG. 6 and FIG. 8, at both end portions of the arch upper 32 is formed a joining end 41 to be joined to the side edge portion of the skin opening portion 40 of the skin 37. This joining end 41 is provided with a joining piece 42 that is joined at a spot point P5 to a projection on the side edge portion of the skin opening portion 40, and a joining flange 43 that is joined at spot points P6 to a position near the inside flange portion 39 of the skin 37. Note that the joining flange 43 is formed so as to be continuous with the flange 34 and 34. Each joining end 41 of the arch upper 32 is joined to the skin 37 by spot welding at these spot points P5 and P6.

As shown in FIG. 7, the arch lower 33 is joined to the back side of the arch upper 32 by spot welding. Specifically, the arch lower 33 is joined in a state of the flange 35 made to superimpose the flange 34 of the arch upper 32 along the vehicle width direction starting from a position a little to the inside of the joining end 41 of the arch upper 32.

The frame unit 4 shown in FIG. 2 is then formed by joining the skin component 17, which has a structure in which the lateral beam 14 consisting of the arch upper 32 and the arch lower 33 is mounted on the skin 37 as shown in FIG. 4, to the frame component 16, which has a structure in which the two hinge stiffeners 22 and 23, the two corner stiffeners 24 and 25, and the lock stiffener 21 are mounted on the frame 18 as shown in FIG. 3.

Here, FIG. 8 shows a perspective view of the coupling portion of the lateral beam 14 of the frame unit 4. FIG. 8 shows the arch upper 32 to be joined to the skin 37 with a chain line on the skin 37 side (upper side of FIG. 8) and with a solid line on the corner stiffener 24 of the frame component 16 (lower side of FIG. 8) in order to aid understanding of the placement positions of the components.

Figure 9:
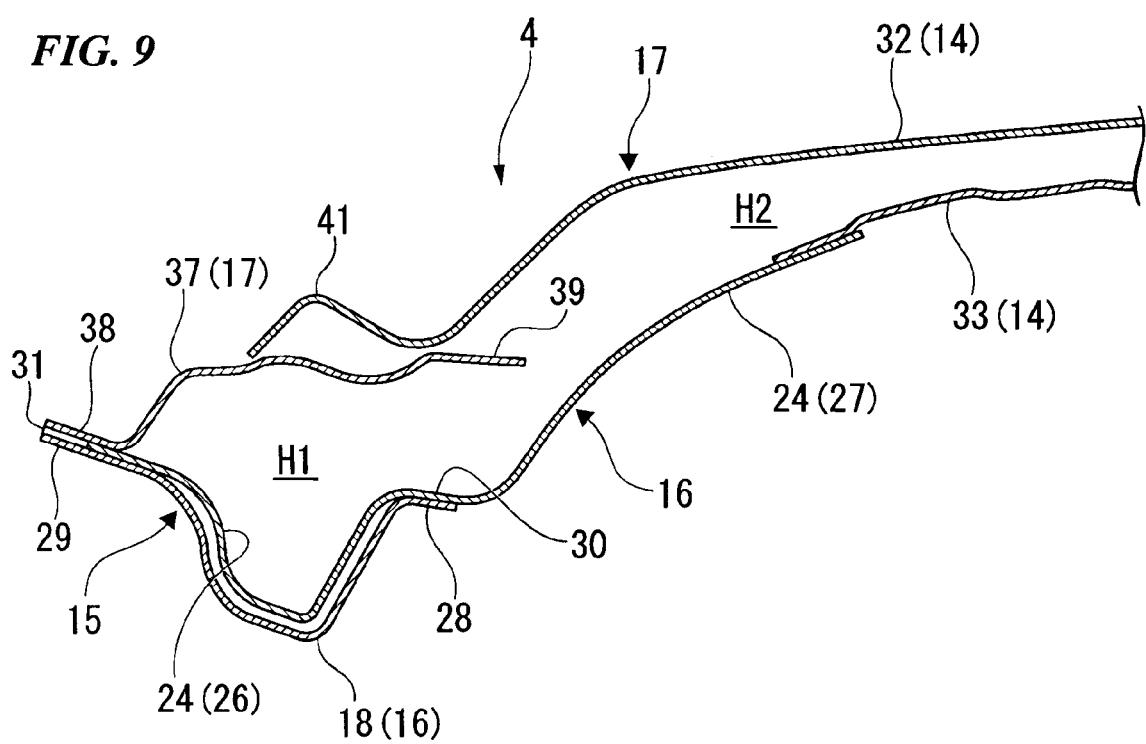
FIG. 9 is a cross-sectional view taken along the line A-A of FIG. 8.

At the coupling portion of the lateral beam 14, the flange 36 of the extending portion 27 of the corner stiffener 24 on the side of the frame component 16 is joined superimposing the flange 34 of the arch upper 32 and the flange 35 of the arch lower 33 that constitute the lateral beam 14 of the skin component 17. For this reason, as shown in FIG. 9, the closed cross section H1 of the frame portion 15 in the frame unit 4 that is formed with a closed sectional structure is continuous with the closed section H2 of the lateral beam 14 that has a closed sectional structure via the corner stiffener 24.

The joining portion 26 of the corner stiffener 24 is sandwiched by the frame component 16 and the skin component 17, and the inside flange 30 of the joining portion 26 is joined to the inside flange portion 28 of the frame 18 at the spot points P2 described above. Then, at the base portion side of the flange 36 of the extending portion 27 of the corner stiffener 24, the inside flange portion 39 of the skin 37 and the arch upper 32 are joined by spot welding at the two spot points P3 described above.

At the end of the flange 36 of the extending portion 27 of the corner stiffener 24, the flange 34 of the arch upper 32 and the flange 35 at the end of the arch lower 33 are joined by spot welding at the spot points P4. Accordingly, it is possible to firmly join the region of the corner stiffener 24 centered on the corner stiffener 24, which has a greater thickness than the other members.

Here, spot points P7 show the welding points of the hinge stiffener 22, the corner stiffener 24, the frame 18, and the skin 37. Since the other spot points are the same as those shown in FIG. 5, identical reference numbers are assigned to identical parts, with explanations therefor omitted.

Thus, when assembling the tailgate 3, first the hinge stiffeners 22 and 23, the corner stiffeners 24 and 25, and the lock stiffener 21 are joined to the frame 18 to form the frame component 16. Separately, the arch upper 32 is joined to the skin 37, and the arch lower 33 is joined to the arch upper 32 to thereby form the skin component 17 that has the lateral beam 14. Then, the frame component 16 and the skin component 17 are joined to form the frame unit 4 of the tailgate 3.

At this time, by coupling the corner stiffeners 24 and 25 of the frame component 16 and the lateral beam 14 of the skin component 17, the closed cross sections H1 and H2 of the frame portion 15 and the lateral beam 14 of the frame unit 4 become continuous at the coupling portions of the corner stiffeners 24 and 25 and the lateral beam 14.

Then, the interior finishing material (not shown) is attached to the interior surface of the frame unit 4, the door glass 9 is mounted in the glass mounting opening portion 5 on the outer side of the frame unit 4, and the extra window panel 10 is mounted in the outer plate member mounting opening portion 6. Moreover, the lower garnish 11 is mounted on the lower side of the extra window panel 10. The rear light 13 may be mounted across the vehicle width direction to the opening portion 12 of the lower garnish 11 so as to correspond to the rear light mounting portion 8.

Accordingly, this embodiment can prevent local changes in the cross-sectional shape at the lower end corner portions of the door glass 9 by making the closed sections H1 and H2 continuous with the corner stiffeners 24 and 25 at the coupling portions of the frame portion 15 and the lateral beam 14 of the frame unit 4. Therefore, it is possible to prevent local reductions in rigidity and increase the rigidity of the tailgate 3. Accordingly, in the case of adopting the tailgate structure that mounts the door glass 9 in a portion of the glass mounting opening portion 5 of the tailgate 3, the support rigidity of the lateral beam 14 provided for supporting the lower end corner portions of the door glass 9 and the frame portion 15 is increased, and so the overall rigidity of the tailgate 3 can be increased.

Also, it is possible to increase the rigidity of the coupling portions of the frame portion 15 and the lateral beam 14 by the corner stiffeners 24 and 25 provided in the frame component 16. Therefore, the rigidity of both lower end corner portions of the door glass 9, which are base portions of the lateral beam 14, can be increased, and the support rigidity of the door glass 9 can be increased. Accordingly, it is possible to increase the rigidity of the tailgate 3 with this point too.

Moreover, since it is possible to employ a structure in which fasteners such as bolts and the like are not required and the closed sections H1 and H2 are connected by welding, cost, weight, and the number of assembly work steps can therefore be reduced.

Moreover, since the corner stiffeners 24 and 25 provided in the frame component 16 are provided with an extending portion 27, it is possible to reliably apportion on the lateral beam 14 the load that acts on both lower end corner portions of the door glass 9. Accordingly, the load on the lateral beam 14 can be reduced, and the lateral beam 14 can be made compact.

Moreover, since the corner stiffeners 24 and 25 have a plate thickness that is greater than the other members, namely, the frame 18, the skin 37, the arch upper 32, and the arch lower 33, it is possible to restrict the increase in plate thickness to only the corner stiffeners 24 and 25, increase rigidity, and minimize an increase in weight. Therefore, it is possible to lighten the tailgate 3.

Moreover, each flange 36 of the extending portion 27 of the corner stiffeners 24 and 25 is provided with a spot point P3 that is weld-joined to the inside flange 39 of the skin 37 that constitutes the frame portion 15 and the joining flange 43 of the arch upper 32 that constitutes the lateral beam 14. Also, each flange 36 is provided with a spot point P4 that is weld-joined to the flange 34 of the arch upper 32 and the flange 35 of the arch lower 33, which constitute the lateral beam 14. Therefore, the coupling strength of the frame portion 15 and the lateral beam 14 can be increased. Therefore, it is possible to increase the support rigidity of the door glass 9.

Also, when assembling the tailgate 3, the corner fasteners 24 and 25 of the frame component 16 and the lateral beam 14 of the skin component 17 are coupled. In this way, by making the closed section H1 and H2 of the frame portion 15 and the lateral beam 14 of the frame component 4 continuous at both coupling portions, it is possible to ensure the positional accuracy of the lateral beam 14 that constitutes the skin component 17 with respect to the frame component 16. Accordingly, the mounting accuracy of the lateral beam 14 with respect to the entire tailgate 3 can be easily ensured, and the fixing accuracy of the door glass 9 can be ensured.

That is, it is possible to ensure the positional accuracy of the joining portion of the inside flange portion 39 of the skin component 17 that constitutes the inside peripheral edge of the frame portion 15 and the inside flange portion 28 of the frame component 16 and the joining portion of the flange 34 of the arch upper 32 and the flange 35 of the arch lower 33 that constitute the inside peripheral edge of the lateral beam 14. Therefore, it is possible to raise the fixing accuracy of the door glass 9 that is bonded with this portion serving as a bonding surface.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rear door that is provided in an openable and closable manner at a vehicle body rear portion, the rear door comprising:
   a frame unit that forms along an external edge of the rear door, said frame unit comprising a frame member on a vehicle interior side and a panel member on a vehicle exterior side, said frame member and said panel member being joined together and cooperating to define a frame opening portion;
   a lateral beam that extends across the frame opening portion so as to partition the frame opening portion into a glass mounting opening portion and outer plate member mounting opening portion;
   a door windshield panel disposed in the glass mounting opening portion such that the lateral beam extends between both lower end corner portions of the door windshield panel; and
   wherein at coupling portions of the frame unit and the lateral beam, the frame unit and the lateral beam each have a closed sectional structure, with closed sections of the frame unit and the lateral beam being continuous.

2. The rear door according to claim 1, wherein coupling members which are separate from the frame unit and the lateral beam are provided to connect the closed sections of the frame unit and the lateral beam at the coupling portions by coupling the frame unit and the lateral beam.

3. The rear door according to claim 2, wherein each coupling member includes an extending portion that is formed along the lateral beam.

4. The rear door according to claim 2, wherein the coupling members at the coupling portions have a plate thickness that is greater than that of the frame member, panel member or lateral beam.

5. The rear door according to claim 2, wherein the coupling members include co-weld portions to be weld-joined to the frame unit and the lateral beam.

6. A method of assembling a rear door that is provided in an openable and closable manner at a vehicle body rear portion, the rear door having a frame portion that is formed along the external edge of the rear door, a door windshield panel that is provided in the frame portion, and a lateral beam that spans between both lower end corner portions of the door windshield panel; the frame portion having a frame member that is provided on the vehicle interior side and a panel member that is provided on the vehicle exterior side; and coupling members being provided that connect closed sections of the frame portion and the lateral beam at coupling portions by coupling the frame member and the lateral beam;
   the method comprising:
   connecting the lateral beam and the panel member to make a panel body;
   connecting the coupling members and the frame member to make a frame body; and
   connecting the panel body and the frame body so that the closed sections are continuous at the coupling portions of the frame portion and the lateral beam.

* * * * *